United States Patent
Park et al.

(10) Patent No.: US 10,891,762 B2
(45) Date of Patent: Jan. 12, 2021

(54) APPARATUS AND METHOD FOR MEDICAL IMAGE DENOISING BASED ON DEEP LEARNING

(71) Applicants: ClariPI Inc., Seoul (KR); Seoul National University R&DB Foundation, Seoul (KR)

(72) Inventors: Hyun Sook Park, Seoul (KR); Jong Hyo Kim, Seoul (KR)

(73) Assignees: CLARIPI INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 164 days.

(21) Appl. No.: 16/194,941

(22) Filed: Nov. 19, 2018

(65) Prior Publication Data
US 2019/0156524 A1 May 23, 2019

(30) Foreign Application Priority Data

Nov. 20, 2017 (KR) .......................... 10-2017-0155115
Oct. 17, 2018 (KR) .......................... 10-2018-0123786

(51) Int. Cl.
*G06T 11/00* (2006.01)
*G06T 5/00* (2006.01)
*G06T 7/00* (2017.01)

(52) U.S. Cl.
CPC .......... *G06T 11/003* (2013.01); *G06T 5/002* (2013.01); *G06T 7/0012* (2013.01); *G06T 2207/10072* (2013.01); *G06T 2207/10081* (2013.01); *G06T 2207/20081* (2013.01); *G06T 2207/20084* (2013.01)

(58) Field of Classification Search
CPC .................................... G06T 7/00; H04N 1/00
USPC .......................................................... 382/131
See application file for complete search history.

(56) References Cited

U.S. PATENT DOCUMENTS

| 10,685,429 | B2 * | 6/2020 | Mentl | .................... G06T 11/008 |
| 10,692,189 | B2 * | 6/2020 | Mentl | .................... G06T 11/008 |
| 2015/0201895 | A1 | 7/2015 | Suzuki | |
| 2017/0256038 | A1 * | 9/2017 | Lee | .......................... G06T 5/005 |
| 2018/0240219 | A1 * | 8/2018 | Mentl | .................... G06T 11/008 |
| 2019/0325621 | A1 * | 10/2019 | Wang | ...................... G06N 3/084 |

FOREIGN PATENT DOCUMENTS

| KR | 20140042531 | 4/2014 |
| KR | 20140130784 | 11/2014 |

* cited by examiner

*Primary Examiner* — Nancy Bitar
(74) *Attorney, Agent, or Firm* — Cantor Colburn LLP

(57) ABSTRACT

Provided is a method for CT image denoising based on deep learning, and the method for CT image denoising based on deep learning includes: extracting examination information from an input CT image; selecting at least one deep learning model corresponding to the examination information from multiple previously trained deep learning models; and outputting a CT image denoised from the input CT image by feeding the input CT image into the selected at least one deep learning model.

11 Claims, 2 Drawing Sheets

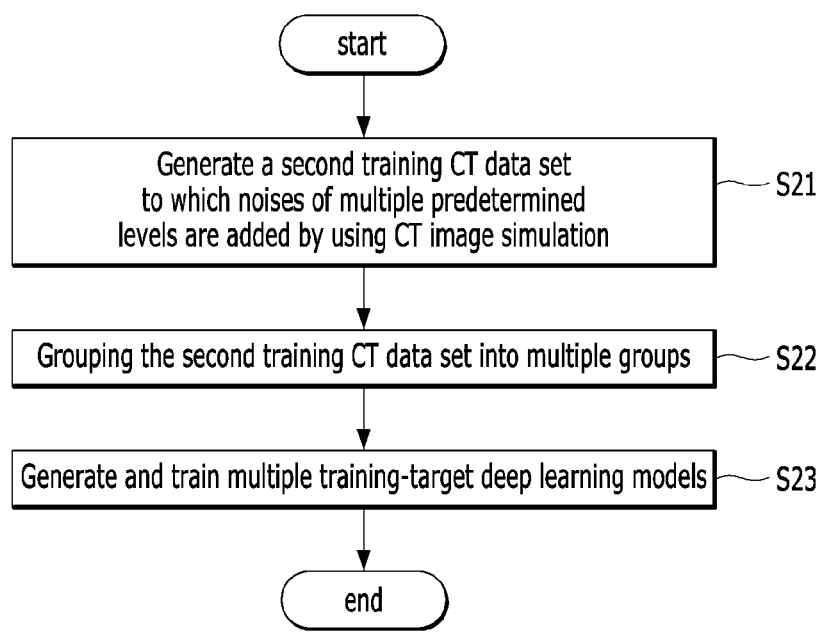

APPARATUS AND METHOD FOR MEDICAL IMAGE DENOISING BASED ON DEEP LEARNING

TECHNICAL FIELD

The present disclosure relates to an apparatus and method for CT image denoising based on deep learning.

BACKGROUND

A computed tomography (CT) scan produces a cross-sectional image of the body lying in a cylinder-shaped large machine equipped with an X-ray generator. This enables a user to more clearly see structures and lesions due to less overlap of structures as compared to a regular X-ray. Therefore, the CT scan has been widely used for scans of most of the organs and diseases.

The quality (resolution, precision) of a CT image is a very important factor for an accurate diagnose of a lesion. With the advancement of a CT system, efforts are underway to improve the quality of a CT image. Examples of the efforts may include a multi-channel detector technology and a high-speed high-resolution image reconstruction technology. However, most of the conventional efforts to improve the quality of a CT image may cause high-dose radiation exposure and thus cause an increased cancer risk to patients. Particularly, considering the recent public awareness of radiation exposure, the efforts to acquire a high-quality diagnostic image need to be accompanied by efforts to minimize a radiation dose.

In an effort to do so, CT scanner manufacturers have released iterative reconstruction CT systems which enable to produce noise-reduced CT images at lower radiation dose. However, it is often not easy to afford the iterative reconstruction CT systems due to higher expenses than conventional products and difficulty in disposal of the conventional products. The CT scanner manufacturers sometimes offer an upgrade program to convert the legacy CT systems into in the iterative reconstruction CT systems. However, those upgrade programs are not applicable to all legacy CT systems due to technical problems and high cost. The present invention was devised to provide a solution to these problems. That is, the development of more effective technology capable of acquiring a high-quality diagnostic image (CT image) while minimizing a radiation dose is needed.

Meanwhile, deep learning technology refers to a new computing technology that can achieve a specific goal by using a general-purpose program code which can be trained according to a given learning data set instead of coding a series of detailed programs and has been acknowledged with its great performance in various image processing fields.

However, in order for a deep learning model to provide desirable performance, it is required to secure enough training data sets. Further, in order for the deep learning model to be trained about data in a predefined range and to operate in response to the data in the predefined range during actual operation, a method for segmenting data is needed. In order to apply deep learning to medical images for which safety is particularly important, it can be more important to develop an effective deep learning technology that fulfills this prerequisite.

The background technology of the present disclosure is disclosed in Korean Patent Laid-open Publication No. 10-2014-0130784.

SUMMARY

In view of the foregoing, the present disclosure provides an apparatus and method for CT image denoising based on deep learning, which can acquire a high-quality diagnostic image (CT image) while minimizing required radiation dose.

Further, the present disclosure provides a training (learning) method for a deep learning model for an apparatus for CT image denoising based on deep learning, which enables deep learning to be more effectively applied to medical images for which safety is particularly important.

Furthermore, the present disclosure provides an apparatus and method for CT image denoising based on deep learning, which uses the advantages of deep learning and can ensure the performance of deep learning and the assurance of safety, and also provides a method for training a deep learning model using the same.

However, problems to be solved by the present disclosure are not limited to the above-described problems. There may be other problems to be solved by the present disclosure.

According to an aspect of the present disclosure, there is provided a method for CT image denoising based on deep learning, including: extracting examination information from an input CT image; selecting at least one deep learning model corresponding to the examination information from multiple previously trained deep learning models; and outputting a CT image denoised from the input CT image by feeding the input CT image into the selected at least one deep learning model.

According to an embodiment of the present disclosure, the method for CT image denoising based on deep learning further includes, before the extracting process, generating a second training CT data set to which noises of multiple predetermined levels are added by applying a CT image noise simulator to a first training CT data set; extracting examination information from the second training CT data set and grouping the second training CT data set into multiple groups according to a predetermined rule; and generating and training multiple training-target deep learning models corresponding to the respective groups of the second training CT data set. In the selecting process, the multiple previously trained deep learning models may be the multiple training-target deep learning models trained in the training process.

Further, in the generating process, the CT image noise simulator may perform: generating a synthetic sinogram by inputting an image (original image) of the first training CT data set; generating a noise-component synthetic sinogram by applying a noise model having a predetermined level of noise to the synthetic sinogram; generating a noise-component CT image based on the generated noise-component synthetic sinogram; and generating a synthetic high noise CT image by adding the generated noise-component CT image to the original CT image.

Furthermore, the second training CT data set may be composed of a pair of synthetic high noise CT image set and synthetic noise-component CT image set obtained on the basis of the first training CT data set.

Moreover, the training process may include feeding the synthetic high noise CT image set for the respective groups of the second training CT data set into the input of the corresponding training-target deep learning model, and training the training-target deep learning model repeatedly by groups to minimize the difference between the synthetic noise-component CT image and the output from the training-target deep learning model in order for the training-target deep learning model to have a function of extracting a noise-component CT image from an input CT image.

Further, the outputting process may include feeding the input CT image into the selected at least one deep learning model and forcing the selected at least one deep learning model to extract a noise-component CT image from the input CT image, and producing the denoised CT image by multiplying the extracted noise-component CT image with a predetermined value and subtracting the result from the input CT image.

Meanwhile, according to another aspect of the present disclosure, there is provided an apparatus for CT image denoising based on deep learning, including: an extraction unit configured to extract examination information from an input CT image; a selection unit configured to select at least one deep learning model corresponding to the examination information from multiple previously trained deep learning models; and an output unit configured to output a CT image denoised from the input CT image by feeding the input CT image into the selected at least one deep learning model.

According to an embodiment of the present disclosure, the apparatus for CT image denoising based on deep learning further includes a training unit configured to generate and train multiple training-target deep learning models, and the training unit may generate a second training CT data set to which noises of multiple predetermined levels are added by applying a CT image noise simulator to a first training CT data set, extract examination information from the second training CT data set and group the second training CT data set into multiple groups according to a predetermined rule, and generate and train multiple training-target deep learning models corresponding to the respective groups of the second training CT data set. The multiple previously trained deep learning models may be the multiple training-target deep learning models trained by the training unit.

Further, the CT image noise simulator may generate a synthetic sinogram by inputting an image (original image) of the first training CT data set, generate a noise-component synthetic sinogram by applying a noise model having a predetermined level of noise to the synthetic sinogram, generate a noise-component CT image based on the generated noise-component synthetic sinogram, and generate a synthetic high noise CT image by adding the generated noise-component CT image to the original CT image.

Furthermore, the second training CT data set may be composed of a pair of synthetic high noise CT image set and synthetic noise-component CT image set obtained on the basis of the first training CT data set.

Moreover, the training unit may feed synthetic high noise CT image set for the respective groups of the second training CT data into the input of the corresponding training-target deep learning model and train the training-target deep learning model repeatedly by groups to minimize the difference between the synthetic noise-component CT image and the output from the training-target deep learning model in order for the training-target deep learning model to have a function of extracting a noise-component CT image from an input CT image.

Besides, the output unit may feed the input CT image into the selected at least one deep learning model and force the selected at least one deep learning model to extract a noise-component CT image from the input CT image, and produce the denoised CT image by multiplying the extracted noise-component CT image with a predetermined value and subtracting the result from the input CT image.

The above-described aspects are provided by way of illustration only and should not be construed as liming the present disclosure. Besides the above-described embodiments, there may be additional embodiments described in the accompanying drawings and the detailed description.

According to the above-described aspects of the present disclosure, CT image denoising is performed based on deep learning, and, thus, it is possible to acquire a high-quality diagnostic image (CT image) while minimizing required radiation dose.

According to the above-described aspects of the present disclosure, multiple deep learning models (multiple training-target deep learning models) are trained according to examination information of a CT image, which enables deep learning to be more effectively applied to medical images for which safety is particularly important.

According to the above-described aspects of the present disclosure, it is possible to provide an apparatus and method for CT image denoising based on deep learning, which uses the advantages of deep learning and can ensure the performance of deep learning and the assurance of safety, and a training (learning) method for deep learning model using the same.

However, effects to be obtained by the present disclosure are not limited to the above-described effects. There may be other effects to be obtained by the present disclosure.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3 is a diagram showing a schematic operation flow example of a method for training a deep learning model for CT image denoising based on deep learning through an apparatus for CT image denoising based on deep learning according to an embodiment of the present disclosure.

DETAILED DESCRIPTION

Figure 1:
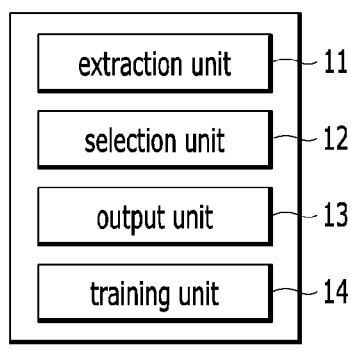
FIG. 1 is a diagram showing a schematic configuration of an apparatus for CT image denoising based on deep learning according to an embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a diagram showing a schematic configuration of an apparatus for CT image denoising based on deep learning according to an embodiment of the present disclosure. Hereinafter, an apparatus for CT image denoising based on deep learning 10 according to an embodiment of the present disclosure will be referred to as the present apparatus 10 for convenience in explanation.

Referring to FIG. 1, the present apparatus 10 may include an extraction unit 11, a selection unit 12, an output unit 13, and a training unit 14.

The extraction unit 11 may extract examination information from an input CT image. Particularly, the extraction unit 11 may extract the examination information from header information included in the input CT image. The examination information may include information about an examination area of the CT image and scan property information.

Herein, the information about an examination area may be, for example, information about an organ area. That is, the information about an examination area may refer to information about a significant human organ area of interest and may include information about organ areas such as head, chest, abdomen, etc. Further, the scan property information may refer to information about CT scan variables which affect noise characteristics of the CT image and may include, for example, information about reconstructed kernel, tube voltage, tube current, slice thickness, etc.

The input CT image may be an image obtained using Computed Tomography (CT), Magnetic Resonance Imaging (MRI), Positron Emission Tomography (PET), etc., but may not be limited thereto.

The selection unit 12 may select at least one deep learning model corresponding to the examination information extracted by the extraction unit 11 from multiple previously trained deep learning models.

The selection unit 12 may select at least one deep learning model (one or more deep learning models) corresponding to the examination information extracted by the extraction unit 11 from the multiple previously trained deep learning models by applying a predetermined rule (previously set rule) to the examination information extracted by the extraction unit 11.

Accordingly, the present apparatus 10 may include multiple deep learning models. Herein, each of the multiple deep learning models is a deep learning model previously trained by the training unit 14 and particularly refers to a deep learning model which has been previously trained to output a CT image (denoised CT image) denoised from an input CT image fed into the deep learning model.

According to another embodiment, each of the multiple deep learning models included in the present apparatus 10 may refer to a deep learning model which has been previously trained to extract a noise-component CT image from an input CT image.

The multiple deep learning models considered by the present apparatus 10 may be generated by the training unit 14. The training unit 14 may generate multiple deep learning models according to examination information. Particularly, the training unit 14 may generate multiple deep learning models according to combinations of examination area information and scan property information included in the examination information of the second training CT image set.

In other words, the present apparatus 10 may include multiple deep learning models which have been generated according to the examination information (examination area information and scan property information). Each of the multiple deep learning models which have been generated according to combinations of examination area information and scan property information may be trained by the training unit 14 using the corresponding second training CT data set (i.e., CT data sets for deep learning) which have been grouped according to combinations of examination area information and scan property information.

In the present disclosure, deep learning models which are not yet trained by the training unit 14 may be referred to as training-target deep learning models. Accordingly, after training, training-target deep learning models will be referred to as previously trained deep learning models. In other words, the multiple previously trained deep learning models considered by the selection unit 12 may refer to the multiple training-target deep learning models which have been trained by the training unit 14. Training of the training-target deep learning models will be described later in more detail.

The selection unit 12 may select at least one deep learning model corresponding to the examination information (examination area information and scan property information extracted by the extraction unit) extracted by the extraction unit 11 from the multiple previously trained deep learning models which have been generated according to the examination information (combinations of examination area information and scan property information) and trained.

The selection unit 12 may select at least one deep learning model for an input CT image using a predetermined rule from the multiple previously trained deep learning models based on the examination information extracted by the extraction unit 11.

For example, we assume an input CT image is an abdominal CT image which is of the first examination area type (e.g., abdomen) and of the first scan property type (e.g., scan property of low dose and thick slice). In this case, the selection unit 12 may select a single deep learning model (e.g., first deep learning model) corresponding to the first examination area type (e.g., abdomen) and the first scan property type which has been trained with a group of second training data set where the examination area type is abdomen with scan property type of low dose and thick slice from the multiple previously trained deep learning models.

For another example, we assume an input CT image is an abdominal CT image which is of the first examination area type (e.g., abdomen) and of the second scan property type (e.g., scan properties of ultra-low dose and thin slice). In this case, the selection unit 12 may select a single deep learning model (e.g., second deep learning model) corresponding to the first examination area type and the second scan property type which has been trained with a group of second training data set where the examination area type is abdomen with scan property type of ultra-low dose and thin slice from the multiple previously trained deep learning models.

For yet another example, we assume an input CT image is a chest CT image which is of a second examination area type (e.g., chest) and of the third scan property type for the first section (e.g., applying the reconstructed kernel having high sharpening property to the lung section) and of the fourth scan property to the second section (e.g., applying the reconstructed kernel having low sharpening to the soft tissue section). In this case, the selection unit 12 may select two deep learning models including a third deep learning model corresponding to the second examination area type and the third scan property type and a fourth deep learning model corresponding to the second examination area type and the fourth scan property type from the multiple previously trained deep learning models. To be specific, the selection unit 12 may select two deep learning models including the third deep learning model which has been trained with a group of the second training data set where the examination area type is chest and the scan property type is the reconstructed kernel having high sharpening property and the fourth deep learning model where the examination area type is chest and the scan property type is the reconstructed kernel having low sharpening property from the multiple previously trained deep learning models.

As such, the selection unit 12 may select one or more deep learning models (i.e., at least one deep learning model) from the multiple previously trained deep learning models based on examination information extracted by the extraction unit 11 in consideration of the combination of examination area information and scan property information included in the extracted examination information.

The output unit 13 may output a CT image denoised from an input CT image by feeding the input CT image into the at least one deep learning model selected by the selection unit 12. That is, the output unit 13 may feed the input CT image into the at least one deep learning model selected by the selection unit 12 and then output a CT image denoised from the input CT image by taking output of the selected at least one deep learning model.

The output unit 13 may feed the input CT image into the at least one deep learning model selected by the selection unit 12 and thus force the selected at least one deep learning model to extract a noise-component CT image from the input CT image, and produce a denoised CT image by taking the extracted noise from the selected at least one deep learning model and multiplying with a predetermined value (a predetermined ratio), and then subtracting the result from the input CT image.

In an embodiment, it can be assumed that the selection unit 12 selects a single (one) deep learning model. In this case, the output unit 13 may feed the input CT image into the single deep learning model selected by the selection unit 12 and thus force the selected single deep learning model to extract a noise-component CT image from the input CT image, and produce a denoised CT image by multiplying the extracted noise-component CT image with a predetermined ratio and subtracting the result from the input CT image.

In another embodiment, it can be assumed that the selection unit 12 selects multiple deep learning models. In this case, the output unit 13 may feed the input CT image into the multiple deep learning models selected by the selection unit 12 and thus force the selected deep learning models to extract noise-component CT images from the input CT image, and produce a denoised CT image by mixing the multiple noise-component CT images extracted by the respective multiple deep learning models according to a predetermined rule followed by multiplying with a predetermined ratio and subtracting the result from the input CT image.

The training unit 14 may generate and train multiple training-target deep learning models before the extraction unit 11 extracts examination information from an input CT image.

Herein, the training unit 14 may generate the second training CT data set to which noises of multiple predetermined levels are added by applying a CT image noise simulator to the first training CT data set, extract examination information from the second training CT data set and group the second training CT data set into multiple groups according to a predetermined rule, and generate and train multiple training-target deep learning models corresponding to the respective groups of the second training CT data set. The training unit 14 may train each of the generated multiple training-target deep learning models.

Herein, once training was completed, those generated multiple training-target deep learning models trained by the training unit 14 may refer to the multiple previously trained deep learning models considered by the selection unit 12.

Further, the CT image noise simulator considered when the training unit 14 generates the second training CT data set may generate a synthetic sinogram by inputting an image (original image) of the first training CT data set, generate a noise-component synthetic sinogram by applying a noise model having a predetermined level (desired level) of noise to the synthetic sinogram, generate a noise-component CT image based on the generated noise-component synthetic sinogram, and generate a synthetic high noise CT image by adding the generated noise-component CT image to the original CT image.

Furthermore, the second training CT data set considered by the training unit 14 may be composed of a pair of synthetic high noise CT image set and synthetic noise-component CT image set obtained on the basis of the first training CT data set.

Accordingly, the training unit 14 may train the training-target deep learning models using a pair of synthetic high noise CT image set and synthetic noise-component CT image set obtained by applying the CT image noise simulator to the first training CT data set.

Further, the training unit 14 may feed the synthetic high noise CT image set for the respective groups of the second CT data set into the input of the corresponding training-target deep learning model and train the training-target deep learning model repeatedly by groups to minimize the difference between the synthetic noise-component CT image and the output from the training-target deep learning model in order for the training-target deep learning model to have a function of extracting a noise-component CT image from an input CT image.

Hereinafter, the training unit 14 will be described in more detail.

The training unit 14 may train a training-target deep learning model using a training CT data set (i.e., CT data set for deep learning training) which has been generated through the CT image noise simulator (the training process takes place before the extraction unit 11 extracts examination information from an input CT image). Herein, the training-target deep learning model may refer to at least one deep learning model.

Before training the training-target deep learning model, the training unit 14 may generate a second training CT data set with noises of multiple predetermined levels (i.e., to which noises of multiple predetermined levels are added) by applying each CT image of the first training CT data set as input into the CT image noise simulator. Then, the training unit 14 may train the training-target deep learning model using the generated second training CT data set.

Herein, the training unit 14 may train training-target deep learning models corresponding to deep learning models included in the present apparatus 10 using the generated second training CT data set in order for the deep learning models to output a low noise CT image denoised from a high noise CT image fed into the deep learning models. In other words, through training of the training-target deep learning models by the training unit 14, each of the deep learning models included in the present apparatus 10 may be trained to output a denoised CT image when a high noise CT image is fed.

After generating the second training CT data set to which noises of multiple predetermined levels are added, the training unit 14 may extract examination information (including examination area information and scan property information) from the second training CT data set and group the second training CT data set into multiple groups according to a predetermined rule. Accordingly, the second training CT data set after grouping according to the predetermined rule may result in groups of second training CT data according to examination areas and groups of the second training CT data according to scan properties.

To be specific, the training unit 14 may generate the second training CT data set for the respective noise levels when generating training CT data set. In other words, the training unit 14 may generate multiple groups of second training CT data set (i.e., CT data set for deep learning) for the respective predetermined noise levels when generating the second training CT data set to which noises of multiple predetermined levels are added.

Then, the training unit 14 may extract examination information including examination area information and scan property information from the second CT data set which have been previously generated for the respective noise levels. Then, the training unit 14 may group the second training CT data set into multiple groups according to a predetermined rule based on the extracted examination information. Herein, the predetermined rule may refer to a rule for classifying CT data (CT images) of the second CT data set (which have been generated for the respective noise levels) into predetermined examination area types and/or predetermined scan property types.

Accordingly, the training unit 14 may classify the second CT data set generated for the respective noise levels into multiple examination area types and/or scan property types and group into multiple groups. That is, the multiple groups of the second training CT data set may include the groups of the second training CT data set classified according to the respective examination areas and the groups of the second training CT data set classified according to the respective scan properties.

Then, the training unit 14 may generate multiple training-target deep learning models corresponding to the multiple groups of the second training CT data sets. That is, according to the present disclosure, the multiple training-target deep learning models generated by the training unit 14 may include multiple training-target deep learning models generated corresponding to the respective examination areas used to classify the second CT data set and multiple training-target deep learning models generated corresponding to the respective scan properties used to classify the second CT data set.

Then, the training unit 14 may train the generated multiple training-target deep learning models with the second training CT data set which have been generated corresponding thereto.

That is, the training unit 14 may train the multiple training-target deep learning models generated corresponding to the respective examination areas using the groups of the second training CT data set classified according to the respective examination areas. Further, the training unit 14 may train the multiple training-target deep learning models generated corresponding to the respective scan properties using the second training CT data set classified according to the respective scan properties.

In other words, the training unit 14 may train (teach) each of the multiple training-target deep learning models generated for the respective examination areas using each corresponding group of the second training CT data set classified according to the respective examination areas. Further, the training unit 14 may train (teach) each of the multiple training-target deep learning model generated for the respective scan properties using each corresponding group of the second training CT data set classified according to the respective scan properties.

Accordingly, the training unit 14 may train (teach) each of the multiple training-target deep learning models (multiple deep learning models) generated corresponding to the respective examination areas and the respective scan properties and included in the present apparatus 10 using each group of the second training CT data set classified according to the respective examination areas and the respective scan properties in order for each of the multiple training-target deep learning models to output a denoised CT image for a high noise CT.

After generating the multiple training-target deep learning models corresponding to the multiple groups of the second CT data set, the training unit 14 may train the multiple training-target deep learning models using the multiple groups of the second training CT data set which have been generated corresponding thereto.

Through training by the training unit 14, each of the multiple deep learning models included in the present apparatus 10 may be trained (may learn) to output a low noise CT image denoised from a high noise CT image when a high noise CT image is fed into the deep learning model.

In other words, the training unit 14 may take an original CT image set (i.e., first training CT data set) as input and generate a new training CT data set for respective noise levels (i.e., second training CT data set for respective noise levels) by using the CT image noise simulator.

Then, for example, the training unit 14 may group the second training CT data set generated for the respective noise levels into multiple groups. That is, the training unit 14 may generate multiple groups of the second training CT data set including the multiple groups of the second training CT data set grouped according to the respective scan properties based on the second training CT data set generated for the respective noise levels.

Then, for example, the training unit 14 may generate, as training-target deep learning models included in the present apparatus 10, multiple training-target deep learning models for the respective scan properties so as to correspond to the multiple groups of the second CT data set grouped according to the respective scan properties.

Then, the training unit 14 may train the multiple training-target deep learning models generated for the respective scan properties using the multiple groups of the second training CT data set grouped according to the respective scan properties. Herein, the training unit 14 may train (teach) each of the multiple training-target deep learning models generated for the respective scan properties in order for the deep learning model (training-target deep learning model) corresponding to the scan properties of an input CT image to output a denoised CT image when a high noise CT image with the scan property of same group is fed to input.

Accordingly, when an input CT image is fed to the present apparatus 10, the selection unit 12 may select a deep learning model according to the scan property type of the input CT image to operate the deep learning model trained with the corresponding group of the second training CT data set having the same scan property type of the input CT image from multiple previously trained deep learning models and then, the output unit 13 may output the denoised input CT image using the selected deep learning model.

Further, the training unit 14 may take the first training CT data set as input and generate a second training CT data set with noises of multiple predetermined levels by using the CT image noise simulator.

Then, for example, the training unit 14 may group the second training CT data set generated for the respective noise levels into multiple groups according to the respective examination area types. That is, the training unit 14 may generate multiple groups of the second training CT data set including the multiple groups of the second training CT data set grouped according to the respective examination area types based on the second training CT data set generated for the respective noise levels.

Then, for example, the training unit 14 may generate, as training-target deep learning models included in the present apparatus 10, multiple training-target deep learning models for the respective examination area type so as to correspond to the multiple groups of the second CT data set grouped according to the respective examination area types.

Then, the training unit 14 may train the multiple training-target deep learning models generated for the respective examination area types using the multiple groups of the second training CT data set grouped according to the respective examination area types. Herein, the training unit 14 may train (teach) each of the multiple training-target deep learning models generated for the respective examination area types in order for a deep learning model (training-target deep learning model) corresponding to the examination area type of an input CT image to output a denoised CT image when a high noise CT image is fed to input.

Accordingly, when an input CT image is fed to the present apparatus 10, the selection unit 12 may select a deep learning model corresponding to the examination area type of the input CT image to operate the deep learning model trained with the corresponding group of the second training CT data having the same examination area type of the input CT image from the multiple previously trained deep learning models and then, the output unit 13 may output the denoised input CT image using the selected deep learning model.

That is, the training unit 14 may generate a second training CT data set grouped according to the respective examination areas and/or respective scan properties and generate and train training-target deep learning models for the respective examination areas and/or respective scan properties.

Further, the second training CT data set generated by the training unit 14 may include at least one pair of image set among the original CT image set (i.e., the first training CT data set), synthetic high noise CT image set, and synthetic noise-component CT image set. In other words, the training unit 14 may generate the second training CT data set including at least one pair of image set among the original CT image set, the synthetic high noise CT image set, and the synthetic noise-component CT image set by using the original CT image set as input into the CT image noise simulator.

The second training CT data set considered by the training unit 14 may be composed of a pair of the synthetic high noise CT image set and the synthetic noise-component CT image set derived from the first training CT data set.

The training unit 14 may feed the synthetic high noise CT image set for the respective groups of the second training CT data set as input into a corresponding training-target deep learning model and train the training-target deep learning model repeatedly by groups to minimize the difference between the synthetic noise-component CT image set and the output from the training-target deep learning model.

That is, the training unit 14 may feed the synthetic high noise CT image set for the respective groups of the second training CT data set as input into the corresponding training-target deep learning model and train the training-target deep learning model repeatedly by groups to minimize the difference between the synthetic noise-component CT image and the output from the training-target deep learning model in order for each of the multiple training-target deep learning models to have a function of extracting a noise-component CT image from an input CT image.

In other words, the training unit 14 may feed each synthetic high noise CT image for the respective groups of the second training CT data set as an input into the corresponding training-target deep learning model sequentially and train the training-target deep learning model repeatedly by groups to minimize the difference between the synthetic noise-component CT image and the output from the training-target deep learning model in order for each of the training-target deep learning model to have a function of extracting a noise component CT image from an input CT image.

Further, the CT image noise simulator used for training by the training unit 14 may generate a synthetic sinogram using an image (original image) of the first training CT data set as input. Furthermore, the CT image noise simulator may generate a noise-component synthetic sinogram by applying a noise model having a predetermined level (desired level) of noise to the generated synthetic sinogram. Moreover, the CT image noise simulator may generate a noise-component CT image based on the generated noise-component synthetic sinogram. Besides, the CT image noise simulator may generate a synthetic high nose CT image by adding the generated noise-component CT image to the original CT image.

As a specific example, the CT image noise simulator may generate a synthetic sinogram using an image (original image) of the first training CT data set as input. Then, the CT image noise simulator may generate a noise-component synthetic sinogram by applying the CT physical principle (i.e., physical principle of CT scan) as a noise model having a predetermined level of noise to the generated synthetic sinogram. Then, the CT image noise simulator may generate a noise-component CT image based on the generated noise-component synthetic sinogram. Then, the CT image noise simulator may generate a synthetic high nose CT image to be included in the second training CT data set for training by adding the generated noise-component CT image to the original CT image.

Herein, when generating a synthetic sinogram, the CT image noise simulator may determine an attenuation coefficient for each pixel of an original CT image, distance information between an X-ray tube focus and a detector, and distance information between the X-ray tube focus and a subject corresponding to an input CT image based on examination information of the original CT image.

Then, the CT image noise simulator may generate a synthetic sinogram based on the determined attenuation coefficient for each pixel, distance information between the X-ray tube focus and the detector, and distance information between the X-ray tube focus and the subject. To be specific, the CT image noise simulator may generate a synthetic sinogram by performing a projection operation for each rotation angle based on the determined attenuation coefficient for each pixel, distance information between the X-ray tube focus and the detector, and distance information between the X-ray tube focus and the subject.

As such, the present apparatus 10 may train each of multiple deep learning models (i.e., multiple training-target deep learning models) through the training unit 14 in order for each of the multiple deep learning models included in the present apparatus 10 to output a low noise CT image denoised from an input CT image fed into the deep learning model. Based on these multiple previously trained deep learning models (multiple training-target deep learning models trained by the training unit), the present apparatus 10 may select a deep learning model corresponding to examination information extracted from the input CT image from the multiple previously trained deep learning models. Then, the present apparatus 10 may feed the input CT image into the selected deep learning model, and, thus, the selected deep learning model can output a denoised CT image (i.e., low noise CT image) denoised from the input CT image.

The present disclosure provides the apparatus for CT image denoising based on deep learning (the present apparatus 10) that outputs a denoised CT image of high quality (low noise CT image) from an input CT image (e.g., low dose input CT image) of a low quality based on multiple previously trained deep learning models. The denoised input CT image output by the present apparatus 10 may have a similar or higher quality compared to a high dosage CT image.

Further, the present apparatus 10 provides a training (learning) method for deep learning model (training-target deep learning model) to output a denoised high quality CT image from a low quality input CT image. The denoised input CT image output by the trained deep learning model (i.e., previously trained deep learning model) may have a similar or higher quality than a high dosage CT image.

In the present apparatus 10, the extraction unit 11 may extract examination area information and scan property information as examination information from an input CT image using examination information included in the input CT image. Then, the present apparatus 10 may select a deep learning model (i.e., deep learning model previously trained to provide a predetermined level of performance) corresponding to the extracted examination information from multiple previously trained deep learning models and output (obtain) a denoised input CT image through the selected deep learning model. In the present apparatus 10, the training unit 14 may train each of multiple training-target deep learning models in order for each of the multiple deep learning models to provide a predetermined level of performance (a level at which the difference between the synthetic noise-component CT image and output from the training-target deep model is reached).

Further, the present apparatus 10 may receive the first training CT data set as input and generate a new training CT data set (second training CT data set) including a synthetic high noise CT image set by using the CT noise simulator and may train training-target deep learning models included in the present apparatus 10 using the generated second training CT data set. The training-target deep learning models included in the present apparatus 10 can become previously trained deep learning models through training using the second training CT data set, and these previously trained deep learning models may refer to the deep learning models previously trained to output a denoised CT image (low noise CT image) from a high noise CT image.

Furthermore, the present apparatus 10 trains the training-target deep learning models using the second training CT data set generated by using the CT noise simulator, and, thus, when a high noise CT image (input CT image) actually obtained by low dose scanning is fed into the present apparatus 10 (i.e., input into at least one of the multiple previously trained deep learning models included in the present apparatus), the present apparatus 10 can more effectively output a low noise CT image denoised from the high noise CT image.

Each of the multiple deep learning models generated for the respective examination area types and respective scan property types and included in the present apparatus 10 can be trained by the training unit 14 to output a CT image denoised from an input CT image.

The present apparatus 10 can be referred to as an apparatus for training a deep learning model (training-target deep learning model) for an apparatus for CT image denoising based on deep learning as well as an apparatus for CT image denoising based on deep learning. The present disclosure can provide a method for training a deep learning model for CT image denoising based on deep learning as well as a method for CT image denoising based on deep learning through the present apparatus 10.

Hereinafter, the flow of the operations of the present disclosure will be described briefly based on the above details.

Figure 2:
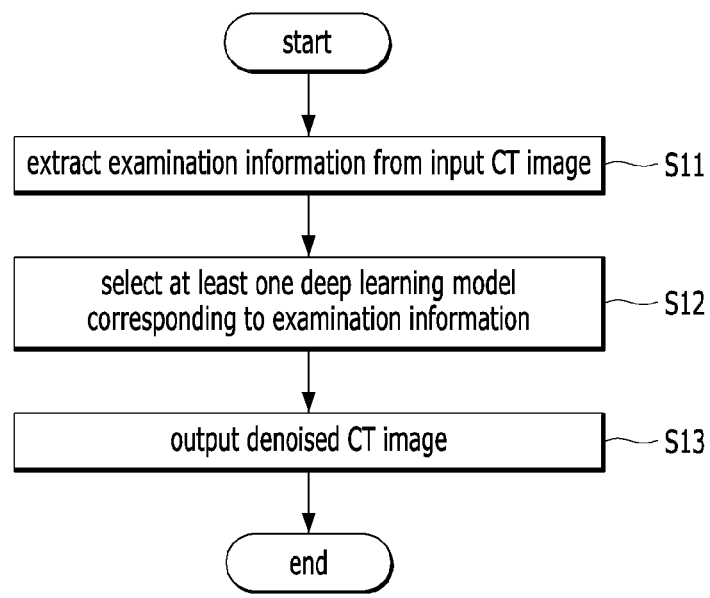
FIG. 2 is a diagram showing a schematic operation flow of a method for CT image denoising based on deep learning through an apparatus for CT image denoising based on deep learning according to an embodiment of the present disclosure.

FIG. 2 is a diagram showing a schematic operation flow of a method for CT image denoising based on deep learning through an apparatus for CT image denoising based on deep learning according to an embodiment of the present disclosure.

The method for CT image denoising based on deep learning illustrated in FIG. 2 can be performed by the above-described apparatus for CT image denoising based on deep learning (the present apparatus 10). Accordingly, the descriptions of the apparatus for CT image denoising based on deep learning (the present apparatus 10) may be identically applied to the method for CT image denoising based on deep learning, even though they are omitted hereinafter.

Referring to FIG. 2, in a process S11 of the method for CT image denoising based on deep learning according to an embodiment of the present disclosure, the extraction unit 11 may extract examination information from an input CT image.

Then, in a process S12, the selection unit 12 may select at least one deep learning model corresponding to the examination information extracted in the process S11 from multiple previously trained deep learning models.

Then, in a process S13, the output unit 13 may output a CT image denoised from the input CT image by feeding the input CT image into at least one deep learning model selected in the process S12.

Herein, in the process S13, the output unit 13 may feed the input CT image into the at least one deep learning model selected in the process S12 and thus force at least one deep learning model selected in the process S12 to extract a noise-component CT image from the input CT image, and output a CT image denoised from the input CT image by multiplying the extracted noise-component CT image with a predetermined value (e.g., a predetermined ratio) and subtracting the result from the input CT image.

Meanwhile, the method for CT image denoising based on deep learning according to an embodiment of the present disclosure may further include generating and training multiple training-target deep learning models before the process S11. Herein, the multiple training-target deep learning models trained through the training process may refer to the multiple previously trained deep learning models considered in the process S12.

Herein, the method for training the multiple training-target deep learning models, i.e., the method for training a deep learning model, will be described with reference to FIG. 3 for easier understanding.

In the descriptions above, the processes S11 to S13 may be divided into additional processes or combined into fewer processes depending on an embodiment. In addition, some of the processes may be omitted and the sequence of the processes may be changed if necessary.

FIG. 3 is a diagram showing a schematic operation flow example of the method for training a deep learning model for CT image denoising based on deep learning through an apparatus for CT image denoising based on deep learning according to an embodiment of the present disclosure. That is, FIG. 3 is a diagram showing a schematic operation flow example of the method for training a training-target deep learning model considered in the present disclosure.

The method for training a deep learning model for CT image denoising based on deep learning illustrated in FIG. 3 can be performed by the above-described apparatus for CT image denoising based on deep learning (the present apparatus 10). Accordingly, the descriptions of the apparatus for CT image denoising based on deep learning (the present apparatus 10) may be identically applied to the method for training a deep learning model for CT image denoising based on deep learning, even though they are omitted hereinafter.

Referring to FIG. 3, in a process S21, the training unit 14 may input the CT image into a CT image noise simulator to train deep learning models included in the present apparatus 10 before the extraction unit 11 extracts the examination information from the input CT image in the above-described process S11 of FIG. 2.

That is, in the process S21, the training unit 14 may provide the CT image noise simulator with the input CT image as input.

To be specific, in the process S21, the CT image noise simulator may generate a synthetic sinogram by inputting an image (original image) of a first training CT data set. Further, the CT image noise simulator may generate a noise-component synthetic sinogram by applying a noise model having a predetermined level (desired level) of noise to the synthetic sinogram. Furthermore, the CT image noise simulator may generate a noise-component CT image based on the generated noise-component synthetic sinogram. Moreover, the CT image noise simulator may generate a synthetic high noise CT image by adding the generated noise-component CT image to the original CT image.

Accordingly, in the process S21, the training unit 14 may generate a second training CT data set to which noises of multiple predetermined levels are added by applying the CT image noise simulator to the first training CT data set before the extraction unit 11 extracts the examination information from the input CT image.

That is, in the process S21, the training unit 14 may receive the first CT data set as input and generate a second training CT data set with noises of multiple predetermined levels by using the CT image noise simulator.

Herein, the second training CT data set may be composed of a pair of synthetic high noise CT image set for respective noise levels and synthetic noise-component CT image set for respective noise levels obtained on the basis of the first training CT data set.

Accordingly, the training unit 14 may train the training-target deep learning models using a pair of the synthetic high noise CT image set for respective noise levels and the synthetic noise-component CT image set for respective noise levels obtained by applying the CT image noise simulator to the first training CT data set.

Then, in a process S22, the training unit 14 may extract examination information from the second training CT data set and group the second training CT data set into multiple groups according to a predetermined rule.

Herein, in the process S22, the training unit 14 can generate multiple groups of second training CT data set for respective examination areas and/or respective scan properties by grouping the second training CT data set into multiple groups.

Then, in a process S23, the training unit 14 may generate and train multiple training-target deep learning models corresponding to the multiple groups of second training CT data set which have been generated in the process S22. That is, in the process S23, the training unit 14 may generate and train multiple training-target deep learning models corresponding to the multiple groups of second training CT data set grouped in the process S22.

To be specific, in the process S23, the training unit 14 may generate and train multiple training-target deep learning models corresponding to the respective groups of second training CT data set generated for the respective examination areas. Further, the training unit 14 may generate and train training-target multiple deep learning models corresponding to the respective groups of second training CT data set generated for the respective scan properties.

In the process 23, the training unit 14 may train each of the multiple training-target deep learning models generated in the process S23 using the corresponding group of the second training CT data set generated in the process S22.

As a specific example, in the process S23, the training unit 14 may use each group of second training CT data set generated for respective examination areas and/or respective scan properties in the process S22 to train each of the training-target deep learning models which have been generated for the respective examination areas and/or respective scan properties in the process S23.

Further, in the process S23, the training unit 14 may feed the synthetic high noise CT image set for the respective groups of the second training CT data set in the S22 as input into the corresponding training-target deep learning model and train the training-target deep learning model repeatedly by groups to minimize the difference between the synthetic noise-component CT image and output from the training-target deep learning model in order for the training-target deep learning model to have a function of extracting a noise-component CT image from an input CT image.

In other words, the training unit 14 may feed each synthetic high noise CT image for the respective groups of the second training data set as an input into the corresponding training-target deep learning model sequentially and train the training-target deep learning model repeatedly by groups to minimize the difference between the synthetic noise-component CT image and output from the training-target deep learning model.

In the process S23, the training unit 14 may train each of the multiple training-target deep learning generated for the respective the examination areas using the corresponding group of the second training CT data set with the same examination area repeatedly. Further, the training unit 14 may train each of the training-target deep learning models generated for the respective scan properties using the corresponding group of the second training CT data set with the same scan property repeatedly.

Accordingly, the multiple training-target deep learning models considered by the present apparatus 10 may include the training-target deep learning models generated for the respective examination areas and the training-target deep learning models generated for the respective scan properties.

In the descriptions above, the processes S21 to S23 may be divided into additional processes or combined into fewer processes depending on an embodiment. In addition, some of the processes may be omitted and the sequence of the processes may be changed if necessary.

The method for CT image denoising based on deep learning and the method for training a deep learning model for CT image denoising based on deep learning according to an embodiment of the present disclosure may be implemented in an executable program command form by various computer means and be recorded in a computer-readable storage medium. The computer-readable storage medium may include a program command, a data file, and a data structure individually or a combination thereof. The program command recorded in the computer-readable storage medium may be specially designed or configured for the present disclosure or may be known to those skilled in a computer software field to be used. Examples of the computer-readable storage medium include magnetic media such as hard disk, floppy disk, or magnetic tape, optical media such as CD-ROM or DVD, magneto-optical media such as floptical disk, and a hardware device such as ROM, RAM, flash memory specially configured to store and execute program commands. Examples of the program command include a machine language code created by a complier and a high-level language code executable by a computer using an interpreter. The hardware device may be configured to be operated as at least one software module to perform an operation of the present disclosure, and vice versa.

Further, the above-described method for CT image denoising based on deep learning and method for training a deep learning model for CT image denoising based on deep learning may be implemented as a computer program or application stored in a storage medium and executed by a computer.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method for medical image denoising based on deep learning, the method comprising: generating multiple trained deep learning models, the multiple trained deep learning models being grouped by examination areas; extracting examination information from an input CT data, the examination information including examination area information; selecting at least one deep learning model corresponding to the examination information from the multiple trained deep learning models; and outputting a CT data denoised from the input CT data by feeding the input CT data into the selected at least one deep learning model wherein the generating comprises: generating a second training CT data set to which noises of multiple predetermined levels are added by applying a CT data image noise simulator to a first training CT data set; extracting examination information from the second training CT data set and grouping the second training CT data set into multiple groups according to a predetermined rule; and generating and training multiple training-target deep learning models so as to correspond to the respective groups of the second training CT data set by groups, wherein in the selecting, the multiple previously trained deep learning models are the multiple training-target deep learning models trained in the generating and training.

2. The method of claim 1, wherein in the generating of the second training CT data set, the CT data noise simulator performs, generating a synthetic sinogram by inputting an image of the first training CT data set; generating a noise-component synthetic sinogram by applying a noise model having a predetermined level of noise to the synthetic sinogram; generating a noise-component CT data based on the generated noise-component synthetic sinogram; and generating a synthetic high noise CT data by adding the generated noise-component CT data to the original CT data.

3. The method of claim 1, wherein the second training CT data set is composed of a pair of synthetic high noise CT data set and synthetic noise-component CT data set obtained on the basis of the first training CT data set.

4. The method of claim 1, wherein the generating and training includes feeding the synthetic high noise CT data set for the respective groups of the second training CT data set into the input of the corresponding training-target deep learning model and training the training-target deep learning model repeatedly by groups to minimize the difference between the synthetic noise-component CT data and output from the training-target deep learning model, in order for the multiple training-target deep learning model to have a function of extracting a noise-component CT data image from an input CT data.

5. The method of claim 1, wherein the outputting includes feeding the input CT data into the selected at least one deep learning model and forcing the selected at least one deep learning model to extract a noise-component CT data from the input CT data and producing the denoised CT data by multiplying the extracted noise-component CT data with a predetermined value and subtracting the result from the input CT data.

6. An apparatus for medical image denoising based on deep learning, the apparatus comprising: an extraction unit configured to extract examination information from an input CT data, the examination information including examination area information; a selection unit configured to select at least one deep learning model corresponding to the examination information from multiple previously trained deep learning models; an output unit configured to output a CT data denoised from the input CT data by feeding the input CT data into the selected at least one deep learning model; and a training unit configured to generate and train the multiple previously trained deep learning models, the multiple previously trained deep learning models being grouped by examination areas wherein the training unit generates a second training CT data set to which noises of multiple predetermined levels are added by applying a CT data noise simulator to a first training CT data set, extracts examination information from the second training CT data set and groups the second training CT data set into multiple groups according to a predetermined rule, and generates and trains multiple training-target deep learning models so as to correspond to the respective groups of the second training CT data set by groups, and the multiple previously trained deep learning models are the multiple training-target deep learning models trained by the training unit.

7. The apparatus of claim 6, wherein the CT data noise simulator generates a synthetic sinogram by inputting an image of the first training CT data set, generates a noise-component synthetic sinogram by applying a noise model having a predetermined level of noise to the synthetic sinogram, generates a noise-component CT data based on the generated noise-component synthetic sinogram, and generates a synthetic high noise CT data by adding the generated noise-component CT data to the original CT data.

8. The apparatus of claim 6, wherein the second training CT data set is composed of a pair of synthetic high noise CT data set and synthetic noise-component CT data set obtained on the basis of the first training CT data set.

9. The apparatus of claim 6, wherein the training unit feeds synthetic high noise CT data set for the respective groups of the second training CT data set into the input of the corresponding training-target deep learning model and trains the training-target deep learning model repeatedly by groups to minimize the difference between the synthetic noise-component CT data and output from the training-target deep learning model, in order for the multiple training-target deep learning model to have a function of extracting a noise-component CT data from an input CT data.

10. The apparatus of claim 6, wherein the output unit feeds the input CT data into the selected at least one deep learning model and forces the selected at least one deep learning model to extract a noise-component CT data from the input CT data and produces the denoised CT data by multiplying the extracted noise-component CT data with a predetermined value and subtracting the result from the input CT data.

11. A non-transitory computer-readable storage medium that stores a program configured to implement a method according to claim 1 on a computer.

* * * * *